United States Patent [19]
Hess et al.

[11] 3,731,801
[45] May 8, 1973

[54] WATER PURIFICATION

[75] Inventors: Howard V. Hess, Glenham; Frank E. Guptill, Jr., Fishkill, both of N.Y.

[73] Assignee: Texaco Inc., New York, N.Y.

[22] Filed: Mar. 15, 1971

[21] Appl. No.: 124,389

[52] U.S. Cl. ..........................210/56, 203/7, 203/100, 210/58
[51] Int. Cl. ..........................C02b 1/22, C02b 5/00
[58] Field of Search ..................203/7, 100; 210/58, 210/21, 22, 56

[56] References Cited

UNITED STATES PATENTS 3,392,089  7/1968  Guptill et al. ..................203/100 X
3,305,456  2/1967  Broughton ..................203/100 X Primary Examiner—Michael Rogers
Attorney—Thomas H. Whaley, Carl G. Reis and L. H. Phelps, Jr.

[57] ABSTRACT

Method of separating from hard water dissolved mineral hardness constituents whose solubility varies inversely with temperature, in which the water temperature is raised by direct, preferably cocurrent contact with a preheated stream of liquid hydrocarbon oil, to a temperature sufficient to precipitate hardness constituents but below the temperature at which the hot oil will extract water, and at a pressure sufficient to maintain the oil and water in liquid phase.

3 Claims, 1 Drawing Figure

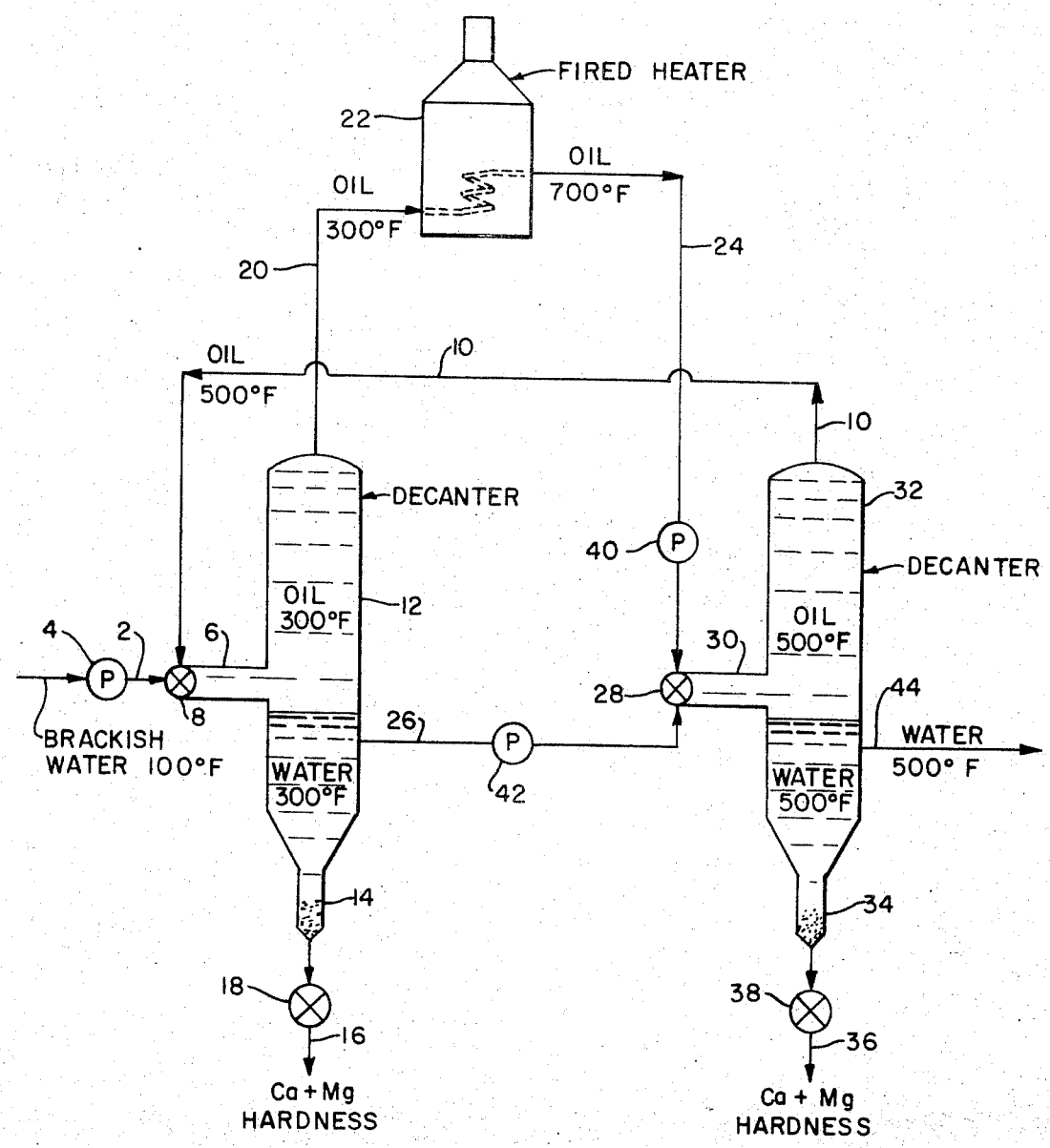

WATER PURIFICATION

The present invention involves the purification of water, particularly brackish water or brine which typically contains various objectionable minerals. In particular, it is useful in the removal of the hardness constituents of, for example, boiler water which is a serious problem in remote locations as, for example, in oil producing fields where the only available water frequently is in an objectionable category from this standpoint.

By way of illustration, many oil producing areas are conventially produced by injection of steam which provides a combination of driving force and flow stimulating qualities which enable economical production from depleted or otherwise difficulty producible reservoirs.

A boiler however, as is known to all skilled engineers, cannot be continuously operated under scaling conditions and since remote and sometimes arid areas of this kind seldom yield pure water, water pre-treatment can be extremely costly and difficult.

In accordance with the present invention the foregoing problems are overcome by controlledly bringing feed water as, for example, a brackish water or brine, to an elevated temperature at which the hardness constituents are essentially insoluble, and thus readily removable. To do this in an ordinary heat exchanger would raise the very problems of scaling which the present invention seeks to obviate. The invention therefore overcomes this problem by effecting a direct contact, liquid flow, heat exchange between the feed water and a circulating liquid hydrocarbon heat exchange medium. Preferably, moreover, the heat exchange is effected by a direct contact, concurrent flow of the two streams.

Under these conditions phenomenal, unanticipated results are realized. For example, by conducting heat transfer between two concurrently moving, liquid phases, scaling is completely avoided, even with ground waters or saline solutions which are heavily contaminated with mineral hardness constituents. On the contrary, the mineral constituents simply separate and tend to drop out or precipitate. In any event, they are readily removable by settling or by any other convenient forms of mechanical separation, as, for example, centrifuging.

Furthermore, the direct, cocurrent heat exchange between two liquids makes available some phenomenal advantages from the standpoint of heat exchange efficiency. This is significantly touched upon in the paper entitled "Heat Transfer between Immiscible Liquids" by S.S. Grover and J.G. Knudsen, Chemical Engineering Progress, Symposium Series, Vol. 51, No. 17. Thus heat transfer coefficients up to 40,000 btu/cu.ft./hour/°F. are readily available. Moreover, as above intimated, the hard water never contacts the hot surfaces of, for example, a fired heater, so that scale does not deposit or accumulate and does not tend to separate until it is specifically caused to settle or segregate.

Actually, magnesium hydroxide, for example, is essentially insoluble in water at temperatures above boiling. Likewise, calcium sulfate has a negligible solubility of only a few parts per million at temperatures in the 500° F. range. Therefore, this is an effective means of purification.

Temperatures are preferably maintained up to the region of 500° F., but not into the range substantially thereabove, at which oil and water tend to complex, as disclosed in our U.S. Pat. Nos. 3,325,400, 3,350,299, 3,350,300, for example. Pressures must be, of course, maintained at levels necessary for and dictated by the requirement that the system be maintained in liquid phase.

By way of illustrating the present invention reference is made to the attached FIGURE of the drawing which shows, more or less diagrammatically, a flow system in which brackish water is introduced via line 2, being pumped up to system pressure by pump 4. 6 represents a somewhat elongated conduit supplied by a mixing valve 8.

The mixing valve is fed not only with the water from pipe 2 but by a circulating, high temperature stream of liquid hydrocarbon oil from pipe 10. Therefore, the oil, say at 500° F. is intimately contacted with the brackish water from pipe 2, resulting in substantial temperature exchange between the two streams flowing in close, turbulent intermixture in pipe 6. As a result, an equilibrium temperature is reached, with substantial preheating of the water.

In decanter 12, into which the effluent from mixing conduit 6 discharges, the oil and water phases separate at identical temperatures. But since the water temperature is now increased, the residual hardness constituents, which are now insoluble at the higher temperature, tend to settle typically as a gelatinous floc in settlement chamber 14 at the lower end of the decanter. This, in turn, may be drawn off from time to time via line 16 and valve 18.

The oil phase from decanter 12 is continuously drawn off via line 20 to a fired heater 22, as shown, where the oil temperature is raised to some desirably high temperature substantially above the water temperature suitable for effecting a second stage temperature increase thereof. Such oil say, at a temperature of 700° F., passes from a fired heater via line 24 on to the second stage concurrent flow heat exchanger system. This, in construction, is the same as the earlier exchanger. It receives the water phase from decanter 12.

Thus the water at, for example, a temperature around 300° F., as shown in the FIGURE, is drawn off from decanter 12 via line 26 and together with the hot oil in line 24 is intermixed in a second mixing head or valve 28. This discharges directly into a second, direct contact, cocurrent, liquid-liquid turbulent-flow heat exchanger 30. Again, this is a column or conduit so sized as to take the mixed ingredients from mixing valve 28 and conduct them along its axis, in highly turbulent direct heat exchange relationship.

As a result, the heat exchanged products reach second decanter 32 at an intermediate temperature between that of the incoming water of conduit 26 and the hot oil stream pipe 24, for instance, about 500° F., at which temperature substantially all of the hardness constituents (for the purposes of the present invention) are insoluble. Therefore, separation of the oil/water phase again takes place, the upper oil phase being withdrawn from the top of the decanter via line 10 and cycling continuously into the first stage heat exchanger 6 as previously described.

The final hardness constituents of the water settle out in settling leg 34 of the decanter usually as a gelatinous floc which again can be periodically removed thru blowdown thru line 36 and valve 38.

Accordingly, therefore, we have a continuously circulating petroleum stream which is continuously fired to a high temperature, passed thru second stage exchanger to bring the water up to final temperature, separated therefrom, circulated over to furnish the heat requirement of the first stage exchanger and then continuously conducted back to the heater. This circulation, of course, is induced by pump 40, and additional pump 42 may be also provided to maintain somewhat higher pressures on the second stage exchanger system than on the first stage system where such is desired in the interests of efficiency.

The final water stream drawn off from decanter 32, as at 44, is therefore essentially hardness free and can be used for steam manufacture for introduction into a subsurface formation or for other uses.

The following table represents a typical operation in accordance with the present invention, employing a brackish feed water containing about 1% dissolved scale forming material and hydrocarbon oil having good stability at the temperatures involved.

In the present example this is a gas oil with a 500° F. average boiling point, specific heat at 75° F. of 0.468 btu per hour per degree fahrenheit, and a thermal conductivity of 0.0825 btu per hour per degree fahrenheit per square foot.

|  | A | B | C | D | E | F | G |
|---|---|---|---|---|---|---|---|
| Water | 13,464 | 116 | 405 | 13,175 |  | 819 | 12,356 |
| Oil | 0 | 28,680 | 0 | 0 | 28,680 |  |  |
| Scale Forming Salts | 136 | 0 | 45 | 91 |  | 91 | 0 |
| Total | 13,600 | 28,796 | 450 | 13,266 | 28,680 | 838 | 12,356 |
| Temp °F in | 60 | 510 |  | 280 | 745 |  |  |
| Temp °F out | 80 | 290 | 280 | 500 | 510 | 500 | 500 |
| Press. psig | 250 | 250 | 250 | 710 | 710 | 700 | 700 |
| BTU per/hr | 2,982 | 2,982 |  | 3,149 | 3,149 |  |  |

The feed rates are given in pounds per hour.
The several streams are identified as follows:
A represents the incoming feed water stream.
B represents the circulating oil stream in pipe 10 approaching the first stage exchanger.
C is the blowdown stream discharged from the settling chamber 14 of the first stage decanter 12.
D is the water stream discharged from the decanter 12 to the second stage heat exchange system.
E is the hot oil stream flowing directly from the heater 24 to the second stage exchanger system.
F represents the discharge or blowdown from the settling chamber 34 of the second stage decanter 32.
G is the final pure water stream delivered thru pipe 44.

As previously intimated, the separation of the scale forming constituents does not tend to occur until the heated water reaches the relatively quiescent area of the decanters where it tends to come out in a more or less gelatinous floc.

Alternatively, however, any suitable means can be employed for facilitating the separation of the solids as, for example, a centrifugal separator or the like.

As previously intimated, hydrocarbon oils, such as kerosene and higher boiling oils, are preferable for the practice of the invention as heat transfer agents. Also typical crude oils are usually suitable not only for the heat transfer cycle but since they may also be used for firing the heater.

While, as previously pointed out, the process is preferably operated below the temperature range at which any substantial proportion of water is extracted into the oil, nevertheless, since operations may take place close to this range, any water which might dissolve in the heat transfer oil merely recycles in the heat transfer loops. It must be understood, however, that at temperatures not appreciably over 500° F., only negligible amounts of water would be dissolved. Conversely, the oil present in the hot stream discharged from line 44 is quite small.

Another advantage of the process is that corrosion due to the presence of mineral salts as, for example, chloride iron corrosion is minimized due to the presence of the oil. Thus it has been demonstrated that even in the case of sea water treatment the intimate association of the water with a flowing liquid oil stream tends to possibly coat the metal surfaces or otherwise in some way not fully understood at present, protect them from the extremely severe effects of chloride ion attack.

The present invention also contemplates recycle of a small proportion of the calcium magnesium hardness to the heat exchangers to provide seed crystals for the separation process.

Also, as previously intimated, liquid-liquid cyclones may be substituted for the decanters where small and compact equipment is desired.

We claim:

1. In the treatment of water to remove dissolved mineral hardness constituents which have a solubility in water which decreases with an increased temperature above normal, the steps of:

flowing said water to a first mixing zone concurrently and in direct contact with a preheated stream of liquid hydrocarbon oil at a first elevated temperature substantially above that of said water and under a pressure sufficient to maintain said oil and said water in liquid phase condition, thereby raising the temperature of said water by an amount sufficient to precipitate at least a substantial proportion of said mineral constituents;

flowing said oil and said water to a first separating zone communicating with said first mixing zone thereby causing said oil and said water to reach substantially the same temperature;

physically drawing off said precipitated minerals from said zone;

continuously separately withdrawing oil and water from said first separating zone;

heating said withdrawn oil to a second temperature higher than said first temperature;

passing said oil at said second temperature concurrently and in direct contact with said separated water and under a pressure sufficient to maintain said oil and said water in liquid phase condition to a second mixing zone thereby raising the temperature of said water by an amount sufficient to precipitate dissolved mineral hardness constituents remaining therein;

flowing said oil and said water to a second separating zone;

physically removing the thus precipitated minerals from said second separating zone;

continuously recycling said oil from said second separating zone now substantially at said first temperature to said first separating zone and withdrawing essentially hardness-free water from said second separating zone.

2. The method of claim 1 wherein said first oil temperature is not substantially above 500°F.

3. The method of claim 1 wherein said second temperature is not substantially above 700°F.

* * * * *